F. R. CADEN & T. H. McCRAY.
Holder for a Mower-Knife Sharpening-Tool.

No. 199,261. Patented Jan. 15, 1878.

WITNESSES:
Henry N. Miller
J. H. Scarborough

INVENTORS
F. R. Caden.
T. H. McCray.
BY
ATTORNEYS.

UNITED STATES PATENT OFFICE.

FRANZ R. CADEN AND THOMAS H. McCRAY, OF EVANSVILLE, INDIANA.

IMPROVEMENT IN HOLDERS FOR A MOWER-KNIFE-SHARPENING TOOL.

Specification forming part of Letters Patent No. 199,261, dated January 15, 1878; application filed November 13, 1877.

*To all whom it may concern:*

Figure 1:
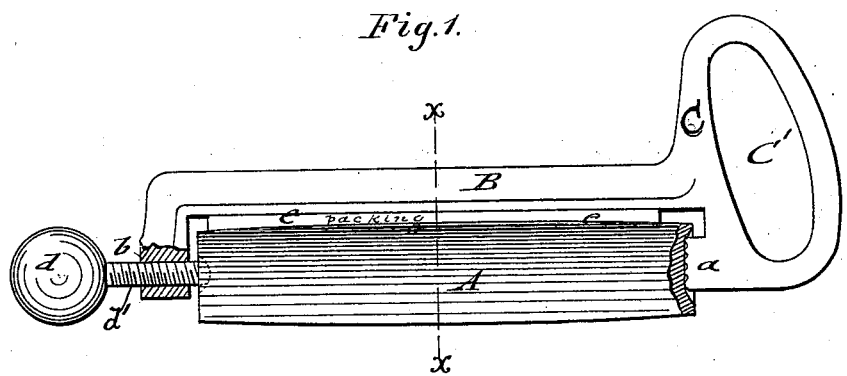
Figure 2:
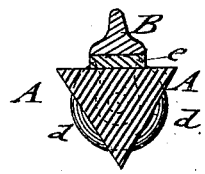

Be it known that we, FRANZ R. CADEN and THOMAS H. McCRAY, of Evansville, in the county of Vanderburg and State of Indiana, have invented a Device for Holding a Grindstone to Sharpen Reaper and Mower Knives, of which the following is a specification:

In the accompanying drawing, Figure 1 represents a side view, partly in section, of our improved grinding device for mower and reaper knives; and Fig. 2 is a vertical transverse section of the same on line $x\ x$, Fig. 1.

Similar letters of reference indicate corresponding parts.

The object of this invention is to provide an improved holder for a hand grinding device for sharpening the knives of mowing and reaping machines in effective and uniform manner by a simple and easily-operated sharpening-stone.

Referring to the drawing, A represents a grinding-stone, which is made of triangular shape, and from eight to twelve inches long and from two to two and a half inches on the sides. The triangular shape of the grinding-stone admits it to be introduced between the teeth of a reaping or mowing machine for sharpening the same. The grinding-stone A is secured to a frame, B, of malleable iron, that has a plane surface, and is provided with a rear handle, C, having a substantially vertical slot, $c$, and a grooved or toothed jaw, $a$, of triangular shape, against which one end of the stone rests. At the opposite end the stone is held by a clamp-screw, $d'$, with ball-shaped handle or head, $d$, which serves the double purpose of tightening the stone in the frame, and also of giving a support for the hand while sharpening the teeth or knives of said machines.

The stone fits, by its triangular shape, into the space between the teeth or knives, and is taken hold of by the right hand at the upper handle, and at the ball by the left hand, enabling thereby the party using the stone to hold it square with the knives, and sharpen them by steady and even strokes, in convenient and uniform manner.

Having thus described our invention, we claim as new and desire to secure by Letters Patent—

The grinding-stone holder consisting of the body B, having a plane under surface, an internally-threaded bent front end, $b$; a front handle, $d$, having screw $d'$, and a rear handle, C, having a substantially vertical slot, $c$, and forward projection $a$, both the projection $a$ and screw $d'$ being capable of being let into the ends of the stone, all as shown and described.

FRANZ RUDOLPH CADEN.
THOMAS HAMBLEN McCRAY.

Witnesses:
CORNELIUS SCHWAB,
ADAM LAMMERT.